US012793443B2

(12) United States Patent
Buss

(10) Patent No.: US 12,793,443 B2
(45) Date of Patent: Nov. 10, 2026

(54) METHOD FOR OPTIMISING THE OPERATION OF AN OPTICAL DISPLAY

(71) Applicant: DAIMLER AG, Stuttgart (DE)

(72) Inventor: Valentin Buss, Stuttgart (DE)

(73) Assignee: MERCEDES BENZ GROUP AG, Stuttgart (DE)

( * ) Notice: Subject to any disclaimer, the term of this patent is extended or adjusted under 35 U.S.C. 154(b) by 1078 days.

(21) Appl. No.: 17/596,449

(22) PCT Filed: Apr. 27, 2020

(86) PCT No.: PCT/EP2020/061649
§ 371 (c)(1),
(2) Date: Dec. 10, 2021

(87) PCT Pub. No.: WO2020/249298
PCT Pub. Date: Dec. 17, 2020

(65) Prior Publication Data

US 2022/0305910 A1 Sep. 29, 2022

(30) Foreign Application Priority Data

Jun. 12, 2019 (DE) ..................... 10 2019 004 167.4

(51) Int. Cl.
*G06V 20/59* (2022.01)
*B60K 35/10* (2024.01)
(Continued)

(52) U.S. Cl.
CPC .............. *G06V 20/59* (2022.01); *B60K 35/10* (2024.01); *B60K 35/22* (2024.01); *B60K 35/25* (2024.01);
(Continued)

(58) Field of Classification Search
None
See application file for complete search history.

(56) References Cited

U.S. PATENT DOCUMENTS 10,001,837 B2 6/2018 Anderson
10,802,582 B1 * 10/2020 Clements ................ G06F 3/013
(Continued)

FOREIGN PATENT DOCUMENTS

CN 103718134 A 4/2014
CN 105759956 A 7/2016
(Continued)

OTHER PUBLICATIONS

International Search Report mailed Jul. 10, 2020 in related/corresponding International Application No. PCT/EP2020/061649.
(Continued)

*Primary Examiner* — Jean Paul Cass
(74) *Attorney, Agent, or Firm* — PATENT PORTFOLIO BUILDERS

(57) ABSTRACT

A method for optimizing the operation of a touch-sensitive optical display involves analyzing the gaze direction of a person using the optical display. At least two display and operating modes are available. A first display and operating mode is activated when the gaze direction of the person is directed in the direction of the optical display. A second display and operating mode is always activated when the gaze direction of the person is not or only partially directed on the optical display.

10 Claims, 1 Drawing Sheet

(51) Int. Cl.

| | |
|---|---|
| ***B60K 35/22*** | (2024.01) |
| ***B60K 35/25*** | (2024.01) |
| ***B60K 35/81*** | (2024.01) |
| ***G06F 3/01*** | (2006.01) |

(52) U.S. Cl.

CPC .............. *B60K 35/81* (2024.01); *G06F 3/012* (2013.01); *G06F 3/013* (2013.01); *G06F 3/016* (2013.01); *B60K 2360/1438* (2024.01); *B60K 2360/149* (2024.01); *B60K 2360/349* (2024.01)

(56) References Cited

U.S. PATENT DOCUMENTS

| | | | | |
|---|---|---|---|---|
| 11,269,420 | B1 * | 3/2022 | Marti | G06V 20/597 |
| 11,907,421 | B1 * | 2/2024 | Clements | G06F 3/012 |
| 2017/0169653 | A1 * | 6/2017 | Froy | G06F 3/012 |
| 2019/0187787 | A1 * | 6/2019 | White | G06F 3/013 |

FOREIGN PATENT DOCUMENTS

| | | | | | |
|---|---|---|---|---|---|
| DE | 102007025531 | A1 | | 12/2008 | |
| DE | 102007049710 | A1 | | 4/2009 | |
| DE | 102012010757 | A1 | | 12/2012 | |
| DE | 102013019572 | | | 5/2015 | |
| DE | 102015212850 | A1 | * | 1/2017 | |
| DE | 102015215862 | A1 | | 2/2017 | |
| EP | 2808826 | A2 | * | 12/2014 | B60R 1/00 |
| KR | 20220083675 | A | * | 6/2022 | |
| WO | 02088824 | A2 | | 11/2002 | |
| WO | WO-2012162060 | A2 | * | 11/2012 | G06F 1/3231 |
| WO | WO-2019091840 | A1 | * | 5/2019 | |

OTHER PUBLICATIONS

Office Action created Sep. 13, 2021 in related/corresponding DE Application No. 10 2019 004 167.4.

Written Opinion mailed Jul. 10, 2020 in related/corresponding International Application No. PCT/EP2020/061649.

Office Action dated Apr. 22, 2025 in related/corresponding CN Application No. 202080042719.5.

* cited by examiner

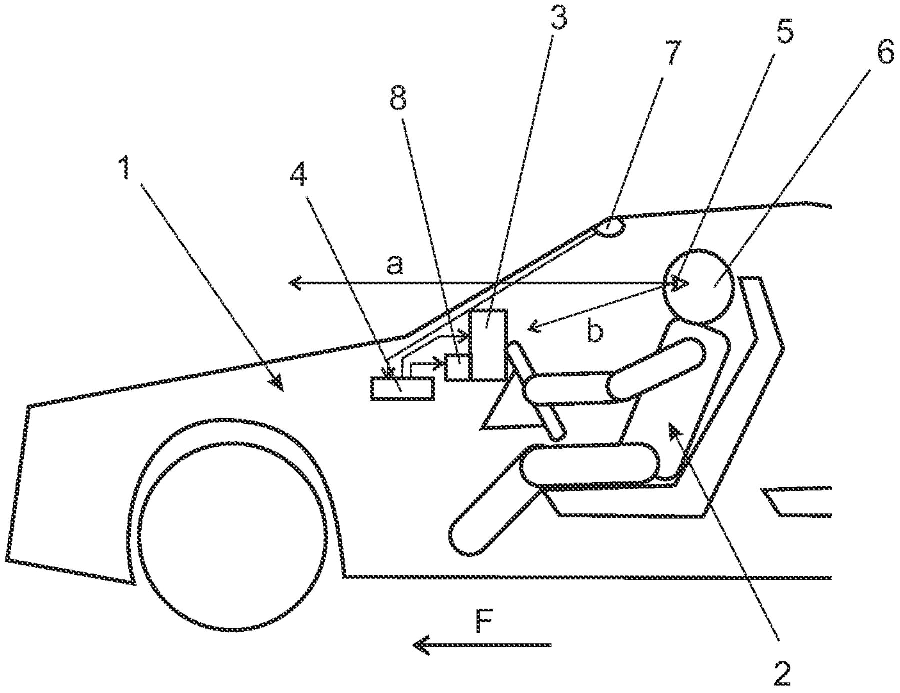
3
7
5
6
8
1
4
a
b
2
F

METHOD FOR OPTIMISING THE OPERATION OF AN OPTICAL DISPLAY

BACKGROUND AND SUMMARY OF THE INVENTION

Exemplary embodiments of the invention relate to a method for optimizing the operation of a touch-sensitive optical display, as well as to the use of such a method in a vehicle.

A generic method is known in principle from US patent publication 10,001,837 B2. The method there uses an optical display in the form of a computer display. Different functions are triggered by analyzing the gaze direction of the user in order to thus facilitate the operation for the user and to correspondingly adjust the content of the display.

Moreover, it is known to use touch-sensitive optical displays in vehicles, the displays simultaneously comprising the function of an operating element along with the functionality of the display. In this context, DE 10 2015 215 862 A1 describes a surface of such an operating element that changes depending on the context.

DE 10 2015 212 850 A1 discloses a method for supporting a user when interacting with a user interface. A gaze direction of the user is ascertained and allocated to a display element on the display device. As soon as the gaze is directed onto a display element, information content generated by a modification of the display element is displayed to it and/or the display element is optically highlighted.

An electronic device is known from WO 2012/162 060 A1, which changes its state depending on the gaze direction of a user. If the gaze is directed onto a screen, a map is depicted for vehicle navigation; if the gaze is turned away from the screen, acoustic navigation instructions are emitted.

WO 2019/091 840 A1 discloses a user interface that behaves differently depending on whether or not a user is observing it. In the first case in which the user directs their gaze onto the user interface, a piece of feedback is visually emitted. In the second case with a gaze turned away from the user interface, a piece of tactile feedback generated via haptic means is carried out. If the user in the second case turns their gaze away, slidable haptic interface elements will assume their extended position, and graphical elements are removed or modified.

Exemplary embodiments of the present invention are directed to further improving a method for optimizing the operation of a touch-sensitive optical display by means of an analysis of the gaze direction of a person using the optical display.

The method according to the invention for optimizing the operation of a touch-sensitive optical display comprises at least two display and operating modes. A first display and operating mode is activated when the gaze direction of the person is directed in the direction of the optical display. If a person gazes at the optical display, then the optical display is operated in a first mode, typically in a mode that could also be referred to as "normal operation". In addition, it can be the case that the gaze direction of the person is not focused or only partially focused on the optical display. However, the person may optionally nevertheless want to operate the optical display, either "blindly" or by them only partially gazing at the optical display, i.e., temporarily again and again, or focusing their gaze direction in such a way that the optical display is in a spatial partial section of their detected field of vision. This kind of operation in the second display and operating mode could also be referred to as "blind operation". Here, the person wants to further operate the optical display, yet is concentrating their gaze direction on something completely different, for example on another person, on the surroundings or similar. The second display and operating mode now provides a corresponding simplification of the operation for exactly this application scenario of the "blind" operation, such that such a quasi-blind operation also still functions relatively well.

In the case of real keys or keyboards, the individual keys can be felt via haptic feedback, such that it can be established as to which key a finger is touching, for example, even without having to gaze directly in this direction. However, in the case of a touch-sensitive optical display as the operating element, this cannot be readily achieved, since although the typically flat surface does show the virtual keys, a border between them is not made palpable. Therefore, in comparison to the first display and operating mode, i.e., the "normal mode", the second display and operating mode can comprise at least one of the measures described below in order to facilitate the "blind" operation according to a very advantageous development of the invention. Thus, an increase of the brightness and/or the contrast of the optical display, for example, can be carried out. When only looking out of the corner of the eye, the difference between individual functional regions on the optical display can thus be recognized more easily, such that the "blind" operation can be facilitated.

Moreover, it is the case that the functional regions that generate a control signal when touched can be correspondingly enlarged according to the invention. It is then also simpler to hit upon the regions when operating, even if not looking at the optical display all or only looking at it out of the corner of the eye. Furthermore, it is helpful to reduce the number of functional regions that generate a control signal when touched. Often it is the case that numerous functional regions, for example of a main menu and a sub-menu, can be correspondingly displayed on such an optical display. In order to now improve the operability in the second display and operating mode, it can be provided to correspondingly reduce the number of these functional regions. In particular, this can be accompanied, in particular, by the design variant, described above, of an enlargement of the functional regions. Operation is then reduced to the few functional regions that are actually important, such as the main menu points. Some sub-menu points can then be displayed again in the next step, such that, overall, a simplification of the depiction and a reduction of the number of functional regions depicted is nevertheless achieved in order to here achieve an improvement in operability without direct complete gaze contact.

A further possibility, which can additionally or alternatively be used, is an enlargement of the necessary force for triggering a control signal via the touch-sensitive optical display. Such an enlargement of the necessary force until a control signal is triggered when touching a functional region also has crucial advantages. Thus, it is possible to run a fingertip over the display without already triggering a function in doing so. The function is only triggered when the fingertip pushes more strongly. This allows for improved searching or resting of the finger in order to then correspondingly touch the correct functional region after a brief glance out of the corner of the eye at the situation and to trigger the requested control signal by means of a stronger force effect. In particular, it is not necessary to start searching for something again with each glance out of the corner of the eye when the finger is left to rest.

It is also possible to correspondingly generate a piece of haptic feedback in the event of operation or, if this is provided in any case, to correspondingly strengthen it. In doing so, it is possible to convey a very good feeling as to whether or not the operation has been successful as a result of the improvement of the feedback, even with a "blind" operation.

Moreover, as a further yet important point, haptic and/or thermal borders between the functional regions can be generated or, if these are readily present, correspondingly enhanced. Examples for such haptic borders would be, for example, the increase of the functional regions in relation to the surrounding regions or even a reduction of the height thereof. Such a method is fundamentally known from DE 10 2015 215 862 A1 which is mentioned above. Further methods can also be used here, for example different vibrations of the surface in different functional regions and/or in the functional regions and the sections lying between them and bordering them. Further haptic feedback, which is based, for example, on electrostatics and has an electrical effect on blood circulation in the fingertips, can be used in order to thus generate a haptic impression, which is only implemented virtually, yet can be felt by the user as an actual haptic impression. Furthermore, it would be conceivable to establish thermal borders by the functional regions, for example, being heated up more intensely using illumination with other and/or additional wavelengths of light than the limiting regions in between, in order to thus be able to establish by means of the temperature difference that can be felt by the fingertips whether they are in a functional regions or on the border between the functional regions.

In particular, in combination with an increase of the force and the reduction of the number of functional regions, it would thus be possible to travel from the easily palpable edge of the optical display across the functional regions and thus to haptically and/or thermally establish that only three functional regions, for example, have been passed and the finger is thus now on the fourth functional region. This could be correspondingly actuated when this is the desired functional region, and indeed even without having to direct the gaze at least briefly from the corner of the eye onto the optical display. Thus, an actual blind operation would be fundamentally conceivable.

According to a further very advantageous design, the method according to the invention provides that, at least if the gaze direction of the person is not or only partially directed onto the optical display, the head position of the person is also analyzed, wherein the second display and operating mode is activated in the event of a head position facing away from the optical display. Along with solely analyzing the gaze direction, the head position of the person can thus also be taken into consideration. If the head position is facing away from the optical display, it can be assumed that the eyes are also not completely directed onto the optical display, and thus the perception of the optical display is not possible or only possible out of the corner of the eye. The head position can thus be used as an additional feature in order to activate the second display and operating mode, i.e., the mode for "blind" operation.

A very advantageous development of the method here provides that the fact that the gaze direction is not or only partially directed onto the optical display is ascertained by the gaze directions occurring during a predetermined period of time being analyzed in terms of their temporal duration. Here, if it is the case that the durations of the gaze directions on the optical display are shorter than the duration during which the optical display is not being gazed at, a gaze direction not or only partially directed onto the optical display can correspondingly be assumed. Correspondingly, in such a case the second display and operating mode can also be activated alternatively or additionally to the analyses previously described.

The method according to the invention provides that an optical sensor, in particular a camera, is used to analyze the gaze direction of the person. Using such a camera, the gaze direction of a person, for example, can be detected by an assessment of the eyes and/or the reflections emerging in the eyes. If the reflections, which are an image of the optical display at which the gaze is directed, do not correspond to the display or the corresponding reflections are outside the region of the pupil or are shifted in relation to it, a gaze direction not or only partially directed onto the optical display must be assumed.

Moreover, it is possible to analyze the head position of the person using the optical sensor, in particular the camera, in order to thus reach further conclusions and achieve an improvement of the analysis for activating the second operating and display mode.

In principle, the method according to the invention can correspondingly be used when operating each touch-sensitive optical display by means of an analysis of the gaze direction. However, the preferred application scenario should be in the field of vehicles. In vehicles it is often the case that a touch-sensitive optical display is arranged, by way of example, in the central instrument in the region of the central console or in the middle of the dashboard. In practice, it is the case that operation is often also to be carried out during the journey. A person driving the vehicle then does not or only very briefly directs their gaze onto the optical display element in order to correspondingly operate it. With conventional operating elements, this operation is relatively simple due to the keys implemented as hardware. With optical display elements with touch-sensitive surfaces, be they a screen or a virtual key in a decorative element, a cladding part or similar, this is virtually no longer possible since this key typically does not emerge in a palpable manner in order to thus not further impede the optical impression of the cladding part or decorative element or the depiction flexibility of the screen. For precisely this case is it now particularly advantageous if the described method can be used in order to facilitate a simple operation for the person driving the vehicle even without the optical display, which simultaneously constitutes the operating element, by constantly keeping it in view. The use, according to the invention, of the method provides that the person driving the vehicle is recorded for analyzing the gaze direction and, in particular, the head position if this is also analyzed, for which at least one interior camera of the vehicle is used as a sensor.

According to the invention, the optimization of the operation is used in moving vehicles. The vehicle thus only offers the optimization of the operation when the vehicle is moving and the person driving the vehicle is thus potentially concentrating on the traffic situation. They are then not able to continuously direct their gaze towards the optical display without putting themselves and other traffic participants in danger. If they need to operate it, they will thus want to carry out this operation blindly or partially blindly with the occasional glance out of the corner of their eye. In particular, the method according to the invention is particularly well suited for this, such that its particularly preferred use is when the vehicle is being driven.

In this preferred use of the method according to the invention, when analyzing the gaze direction, it can here be analyzed as to whether the gaze direction or the partial gaze direction is directed in the driving direction of the vehicle.

With such a gaze direction in the driving direction of the vehicle, it must be assumed that the person driving the vehicle primarily has their eye on the traffic flow. In this case, the second display and operating mode is activated in order to correspondingly facilitate the blind operation or the operation out of the corner of the eye.

The same applies to the head position. When the head position is aligned in the driving direction of the vehicle, it must also be assumed that the primary gaze is directed in the driving direction, such that the second display and operating mode is also activated in this situation. Here, it is also the case that the gaze direction or a gaze direction directed for the most part in one direction, for example in the driving direction of the vehicle, is analyzed either via the spatial distribution of the gaze, yet in particular via the temporal distribution of the gaze in the driving direction and onto the optical display, such that the blind operation is correspondingly active with a gaze direction completely or extensively facing away from the optical display direction.

As already mentioned, the touch-sensitive optical display can be a touch-sensitive screen fixedly mounted on the vehicle. Additionally, or alternatively, touch-sensitive surfaces of a cladding part or decorative element inside the vehicle can also be correspondingly used, such that the operation of virtual "buttons" arranged therein, which are sometimes only made visible using illumination when a hand approaches them, can be correspondingly facilitated.

Further advantageous designs of the method according to the invention and its use also emerge from the exemplary embodiment, which is depicted in more detail below with reference to the FIGURE.

BRIEF DESCRIPTION OF THE DRAWING FIGURE

The sole FIGURE shows a part of a vehicle with a person driving the vehicle inside it for explaining the method according to the invention.

DETAILED DESCRIPTION

In the depiction of the sole FIGURE, a vehicle labelled with 1 can be seen in a cross-section. A person, labelled with 2, who is driving the vehicle 1, is in the vehicle 1. In addition, an optical display 3, for example the screen of a central operating device, is now available to this person 2. Various functions, for example media devices, functions of the vehicle, navigation functions and similar, can be controlled and visualized using this optical display 3. The optical display 3 is here correspondingly controlled via a control device 4. The desired content is correspondingly depicted on the optical display 3 for the person 2, and virtual functional regions are displayed that trigger corresponding control signals on the touch-sensitive surface of the optical display 3, for example by tapping a finger, in order to thus control the functions.

At least when driving the vehicle 1 in the driving direction F or also in an opposite driving direction when reversing the vehicle 1, it is the case that the person 2 is concentrating completely or for the most part on the traffic situation. Their gaze direction a, b starting from an indicated eye 5 is thus directed in the driving direction F of the vehicle, so forwards. This is indicated by the arrow, labelled with a, corresponding to the gaze direction. In contrast, if the person wants to observe the optical display 3, in particular in order to tap a corresponding functional region for operation, their gaze direction will instead be directed on the optical display 3 corresponding to arrow b. In particular, this is simply possible when the vehicle 1 is at a standstill. However, if the vehicle 1 is moving, the gaze direction a, b will extensively be on the traffic situation, i.e., the gaze direction a will thus be in the driving direction F of the vehicle 1 for a clearly longer amount of time, and if something is to be operated on the optical display 3, only a small amount of time is used for a gaze virtually out of the corner of the eye onto the optical display 3 corresponding to gaze direction b. The person 2 is thus only able to observe the optical display 3 and to operate the functional regions located thereon to a limited extent during the journey. Typically, this can also be recognized by the fact that the head 6 of the person 2 is extensively aligned in the driving direction F of the vehicle 1 and not diagonally downwards and/or diagonally sideways at the optical display 3.

In order to now correspondingly evaluate the gaze directions a, b of the person 2 and, optionally, the posture of their head 6, an interior camera 7 is used in the vehicle 1. Of course, the use of several cameras, which are arranged distributed across the interior chamber, is also conceivable. If it now emerges from the gaze direction a, b that the gaze is not, or only partially virtually out of the corner of the eye, directed onto the optical display 3 while something is to be operated on this because, for example, a hand, not depicted here, of the person 2 is approaching this optical display 3, then it can be changed from a normal first display and operating mode of the optical display 3 to a second display and operating mode by means of the control device 4. This then virtually allows for a "blind" operation of the optical display device 3. For this, various measures can be implemented individually or in combination with one another. For example, an additional device 8, which could also be integrated in the optical display 3, can be correspondingly controlled for generating haptic feedback via the control device 3, in order to give haptic feedback when operating the optical display 3 or to enhance this in relation to the normal mode of the operation. Other possibilities for improving and simplifying the operability of the optical display 3 without gazing at it or only with the occasional glance out of the corner of the eye at the optical display 3 are also possible. The aspects used for this can comprise, individually or in combination with one another, for example, the brightness, an enlargement of the switching surfaces, an enhancement of the contrast and/or a masking of subordinate functional regions or those allocated to passive functions, e.g., switching surfaces. In the second display and operating mode, the force necessary for triggering an input can also be correspondingly increased, such that it is possible to move the finger across the optical display 3 without immediately triggering unwanted inputs. Only with a greater pressing force on the optical display 3 would the input be triggered in this case. Moreover, this can be supported by an adjustment of the haptic feedback in order to make switching surfaces or the borders between the switching surfaces palpable, for example, and to reach transitions between the switching surfaces, for example. The virtual latching of switching buttons can also be simulated by a piece of corresponding haptic feedback. For example, a simulated surface structure could also be implemented so that functional regions can be felt.

One possibility for implementing this would be, for example, the use of inherently known piezoelectric engines, in order to give a piece of piezoelectric feedback. A piece of thermal feedback could be implemented in order to thus implement different functional regions or the borders between these by means of different temperatures on of the surface of the optical display. All this simplifies the operation when the gaze is turned away or partially turned away. Advantageously, this is supplemented by larger functional regions and stronger contrasts, in order to also ensure a simplified operation from the corner of the eye if the person 2 using the vehicle 1 only glances at the optical display 3 to a certain extent.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method, comprising:

determining a gaze direction of a person using a touch-sensitive optical display in a motor vehicle;

activating, based on the determined gaze direction, at least one of a first and second display and operating mode of the touch-sensitive optical display, wherein the first display and operating mode is activated when the gaze direction of the person is directed in a direction of the touch-sensitive optical display and the second display and operating mode is always activated when the gaze direction of the person is not or is only partially directed on the touch-sensitive optical display, wherein the second display and operating mode provides simplified operability of the touch-sensitive optical display compared to the first display and operating mode by enlarging functional regions of the touch-sensitive optical display that are operable by touch, and wherein the second display and operating mode is only activated when the motor vehicle is moving.

2. The method of claim 1, wherein at least in when the gaze direction of the person is not or is only partially directed at the touch-sensitive optical display, a head position of the person is additionally determined, wherein the second display and operating mode is activated when the determined head position is facing away from the touch-sensitive optical display.

3. The method of claim 1, wherein the determination the gaze direction is not or is only partially directed at the touch-sensitive optical display comprises analyzing gaze directions of the person during a predetermined period of time with regard to a temporal duration of the gaze directions, wherein the gaze direction is not or is only partially directed on the touch-sensitive optical display is determined when a duration of gaze directions on the touch-sensitive optical display is shorter than a duration of gaze directions not on the touch-sensitive optical display.

4. The method of claim 1, wherein the gaze direction of the person is determined using a camera of the motor vehicle.

5. The method of claim 2, wherein the head position of the person is determined using a camera.

6. The method of claim 1, wherein the second display and operating mode comprises at least one of the following measures compared to the first display and operating mode:

increasing brightness or contrast of the touch-sensitive optical display;

reducing a number of functional regions on the touch-sensitive display that generate a control signal when touched;

increasing a required force to trigger a control signal via the touch-sensitive optical display;

generating haptic feedback or enhancing the haptic feedback when one of the functional regions of the touch-sensitive optical display is touched; or creating or enhancing haptic or thermal limits between functional regions that generate a control signal when touched.

7. A method, comprising:

determining a gaze direction of a person using a touch-sensitive optical display in a motor vehicle by recording, using an interior camera of the motor vehicle that records a head position of the person;

activating, based on the determined gaze direction, at least one of a first and second display and operating mode of the touch-sensitive optical display, wherein the first display and operating mode is activated when the gaze direction of the person is directed in a direction of the touch-sensitive optical display and the second display and operating mode is always activated when the gaze direction of the person is not or is only partially directed on the touch-sensitive optical display, wherein the second display and operating mode provides simplified operability of the touch-sensitive optical display compared to the first display and operating mode by enlarging functional regions of the touch-sensitive optical display that are operable by touch, and wherein the second display and operating mode is only activated when the motor vehicle is moving.

8. The method of claim 7, wherein the second display and operating mode is activated when the determined gaze direction is completely or substantially in a driving direction of the motor vehicle.

9. The method of claim 7, wherein the second display and operating mode is activated when the recorded head position is in a driving direction of the motor vehicle.

10. The method of claim 7, wherein the touch-sensitive optical display is a touch-sensitive screen fixedly mounted in the motor vehicle or a touch-sensitive surface of a cladding part or decorative element in an interior chamber of the motor vehicle.

* * * * *